R. H. BURFEIND.

Reissued Dec. 18, 1917. AUTOMATIC TELEPHONE SYSTEM. 14.411.

APPLICATION FILED NOV. 13, 1917.

3 SHEETS—SHEET 1.

WITNESSES
A. Andersen.
G. Yanochowski

INVENTOR:
Raymond H. Burfeind
Bulkley & Swinarton
ATTORNEYS.

R. H. BURFEIND.

Reissued Dec. 18. 1917. AUTOMATIC TELEPHONE SYSTEM. 14,411.

APPLICATION FILED NOV. 13, 1917.

3 SHEETS—SHEET 2.

WITNESSES
A. Andersen.
G. Yanochowski

INVENTOR:
Raymond H. Burfeind
Bulkley & Swenarton
ATTORNEYS.

R. H. BURFEIND.

AUTOMATIC TELEPHONE SYSTEM.

Reissued Dec. 18, 1917. 14,411.

APPLICATION FILED NOV. 13, 1917.

3 SHEETS—SHEET 3.

WITNESSES
A. Andersen.
G. Yanchowski

INVENTOR:
Raymond H. Burfeind
Bulkley & Swenarton
ATTORNEYS.

UNITED STATES PATENT OFFICE.

RAYMOND H. BURFEIND, OF CHICAGO, ILLINOIS, ASSIGNOR TO AUTOMATIC ELECTRIC COMPANY, OF CHICAGO, ILLINOIS, A CORPORATION OF ILLINOIS.

AUTOMATIC TELEPHONE SYSTEM.

14,411. Specification of Reissued Letters Patent. Reissued Dec. 18, 1917.

Original No. 1,237,998, dated August 21, 1917, Serial No. 775,067, filed June 21, 1913. Application for reissue filed November 13, 1917. Serial No. 201,879.

*To all whom it may concern:*

Be it known that I, RAYMOND H. BURFEIND, a citizen of the United States of America, and resident of Chicago, Cook county, Illinois, have invented certain new and useful Improvements in Automatic Telephone Systems, of which the following is a specification.

My invention relates to improvements in automatic telephone systems, and more particularly to an improved type of switch for use in such systems which is enabled not only to select an idle contact from among a group of such contacts, but is enabled to select an idle contact in any one of a number of such groups.

Heretofore, in connection with the selector switches which have been commonly employed, these selector switches were provided with a plurality of bank contacts, usually arranged in different levels, each level constituting a group. When the selector was raised to the proper level it then rotated automatically to select an idle trunk in that level. As there were usually but ten such trunks in one level, it will be seen that this automatic selection was confined to a comparatively small group of trunks. It often happens that it is desirable to have a larger group of trunks any one of which can be employed in extending the connection, for instance, where a connection is extended to a manual operator's position. An object of my invention is, therefore, to provide a switch which, if all the trunks in one level or group are busy, will automatically step to the next level or group and then automatically select an idle trunk in this second group. If desired, two three or more groups can be automatically selected in this manner, and after the switch has found a group in which there is an idle trunk, it then rotates to find the first idle trunk in this particular group. If all the trunks in all of the common groups are busy, means are then provided for giving the subscriber the usual busy signal.

A further feature of my invention is its adaptation to what is known as a rotary connector—that is, a connector which, on certain levels, is provided with means for automatically selecting one of a plurality of trunk lines any one of which may be employed for extending the connection. Heretofore, as in the selectors, this automatic selection has been confined to the terminals in one group or level, but by my invention I am enabled to increase the number of terminals which can be automatically selected by having the connector automatically step from one level or group to the next when all the terminals in one group are busy.

These and other objects of my invention will be more clearly understood by reference to the accompanying drawings, in which I have illustrated diagrammatically an automatic telephone system of a particular type embodying the novel features of my invention.

Figure 1 is a diagrammatic layout of a telephone system in connection with which I have chosen to illustrate my invention.

Figs. 2 and 3 taken together show a complete connection established through automatic switches embodying the principles of my invention, with a trunk line leading to a manual or private branch exchange such as shown at W in Fig. 1.

Fig. 4 is a detail view showing a portion of the selector auxiliary bank of contacts.

Fig. 5 is a sectional view taken on the line 5—5 in Fig. 4.

Figure 1:
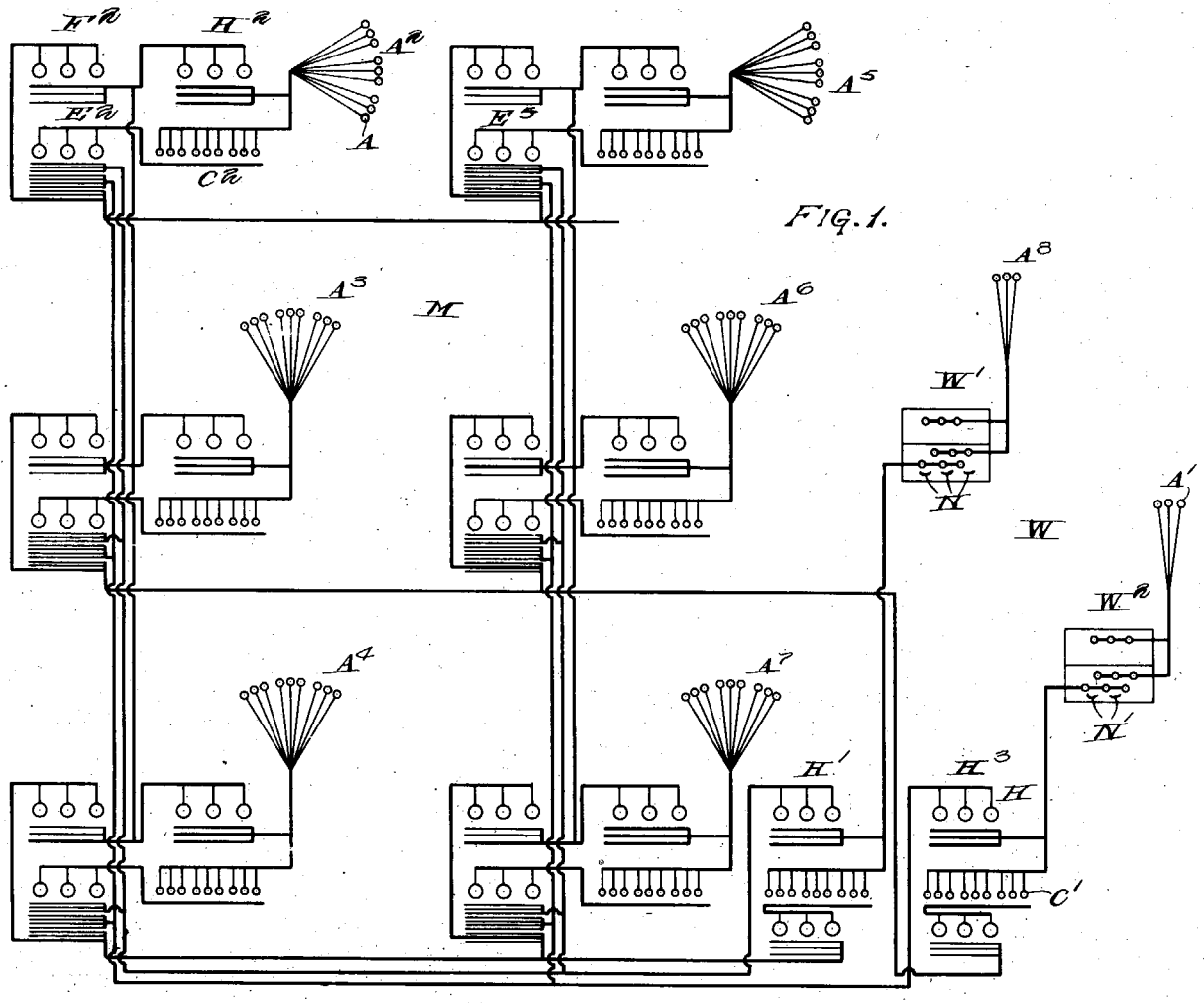

The telephone system illustrated in Fig. 1 comprises an automatic exchange M and a manual exchange or exchanges W. The manual exchanges are represented by manual switchboards W′ and W² and are provided with suitable cord circuits N and N′ for establishing connection between said manual exchanges W and the automatic exchange M. It is thought unnecessary to explain in detail the operations of the manual apparatus used in this system, as they are generally well known. The automatic exchange M is of a well-known type, comprising subscribers' individual switches, first selector switches, second selector switches and connector switches. In addition to the usual connectors, the system is also provided with a plurality of connectors which are adapted to select trunks leading to the manual exchanges W. In the drawings there are represented, on a scale of three to ten, two of the thousands of an exchange of ten thousand lines capacity. The automatic subscribers' substations are divided into groups $A^2$, $A^3$, etc., usually of one hundred lines each. On a scale of three to ten, therefore, the three groups $A^2$, $A^3$ and $A^4$ represent one complete thousand and the groups $A^5$, $A^6$ and $A^7$ represent another thousand.

The selector and connector switches represented herein comprise banks of contacts arranged in horizontal rows or levels, usually ten in number. These levels are represented by horizontal lines which extend beneath all the switches of a group to indicate that the corresponding contacts of all of the switches are multipled together. All of the ten bank levels of the first selectors are represented, while the banks of the second selectors and connectors are shown on a scale of three to ten. All of the line switches belonging to one group of subscribers' lines (the line switches $C^2$, for example) have common access to a group of first selectors, such as the selectors $E^2$. The bank contacts of the first selectors $E^2$, $E^5$, etc., of corresponding groups or hundreds are multipled throughout the different thousands. The first levels of these first selectors are connected to trunk lines leading to second selector switches associated with the first thousand, the second levels of the first selectors are connected to trunk lines leading to the second selectors associated with the second thousand, and the third level is connected to trunk lines leading to the third thousand (not shown). As shown in the drawings, the fourth, fifth, sixth and seventh levels are multipled together and extend to a plurality of connector switches shown at $H^3$. The connectors $H^3$ in turn have access to the trunk lines leading to the manual board $W^2$. The first selector levels 8, 9 and 10 are also multipled together and extend to a plurality of connectors shown at $H'$, which connectors have access to trunk lines leading to the manual board $W'$. It will be understood, of course, that the number of levels that I show connected to the manual board is arbitrary and may be changed to suit the requirements. The bank contacts of all the second selectors associated with a given thousand are multipled together and the first level is connected to trunk lines leading to the connector switches which have access to the subscribers' lines of the first hundred of that thousand. The second level is connected to trunk lines leading to connectors which have access to the lines of the second hundred of that thousand, etc.

The automatic substation A (Fig. 2), which we will assume is in the group $A^2$, comprises the usual receiver 2, transmitter 3, ringer 4 and condenser 5. Being an automatic substation it is also provided with a suitable impulse-transmitting mechanism for controlling the automatic switches, which mechanism is represented diagrammatically by a pair of impulse springs 6 and 7 and an impulse wheel 8, which latter may be controlled in a well-known manner, through the medium of a dial provided with finger holes, in such a way that the impulse springs may be momentarily separated a number of times corresponding to the respective digits of the number of the called subscriber.

The subscriber's individual switch C is of the general type of subscriber's switch shown in British patent to R. W. James No. 26,301 of 1906, being, however, of the particular type disclosed in British patent to T. G. Martin No. 1419 of 1910. This line switch comprises, among other details, a plunger (not shown) attached to the end of a so-called plunger arm 9 which is controlled by the magnet 10. The magnet 10 comprises four windings, namely, a pull-down winding 11, cut-off or holding winding 12, line winding 13 and auxiliary winding 14. The core of the magnet 10 is so constructed that the magnetic circuit of the windings 11 and 12 is separate from that of the winding 13 and 14. The winding 11 operates both the plunger arm 9 and the armature 15, while the winding 12 is only strong enough to operate the cut-off armature 15 and to hold the plunger arm 9 in its operated position after it has been operated. When the plunger arm 9 is operated, the plunger is forced into the bank of contact springs, forcing the springs 16, 17, 18 and 19 into engagement, respectively, with the springs 20, 21, 22 and 23. Although only one set of springs (16 to 23) is shown, each line switch is provided with a plurality of such sets, each set forming the terminal of a trunk line leading to a first selector switch E. Each trunk line is connected in multiple to the corresponding springs of all the line switches of the group which are controlled by the master switch D. The switch C is controlled by the subscriber through the medium of the line relay 13, as will be hereinafter more fully explained.

The master switch D is of the same general type as that disclosed in British Patent No. 26,301 of 1906, referred to above, being, however, of the particular type disclosed in the above-mentioned British Patent No. 1419 of 1910. The function of the master switch, as is well known, is to maintain the plungers of all the idle line switches in position to engage the terminals of an idle trunk line.

Figure 2:
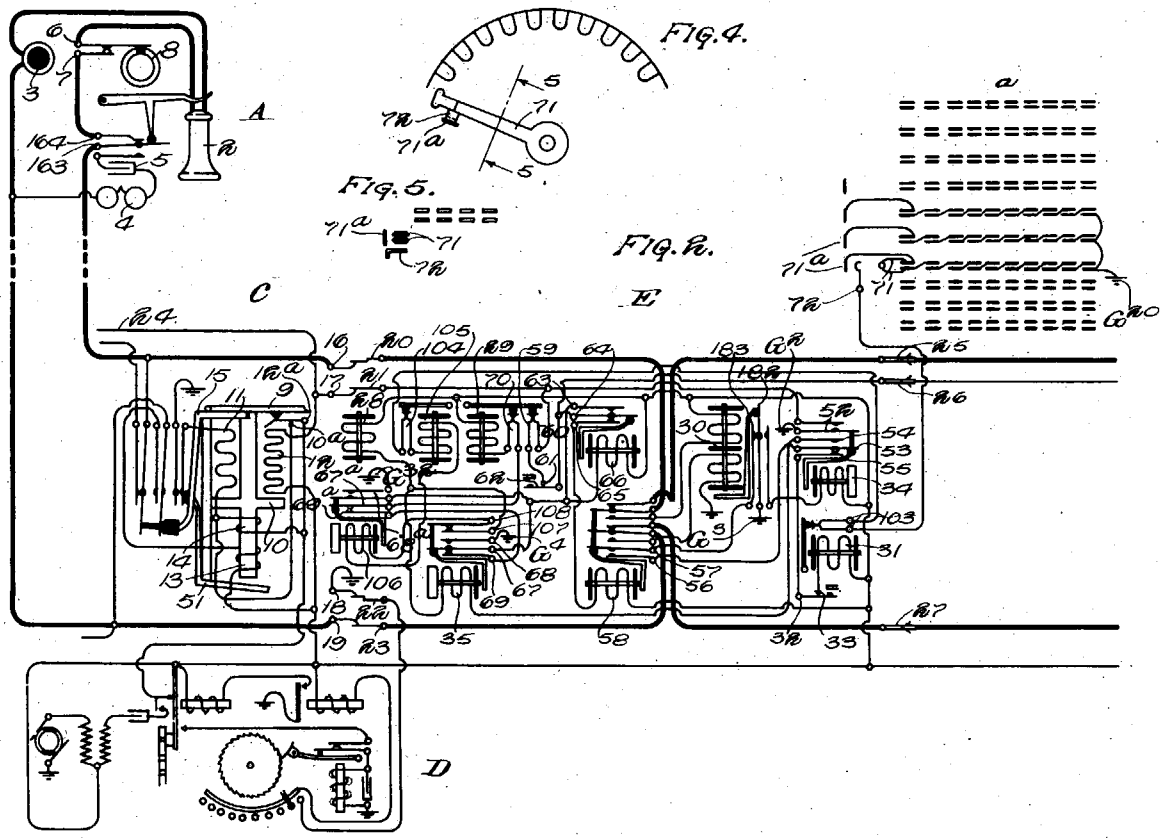

The first selector switch E is of the general type of selector switch disclosed in United States Letters Patent No. 815,321, issued March 13, 1906, to Keith, Erickson and Erickson, the circuits being modified, however, to operate in a system embodying the principles of my invention. Among other details, the selector E comprises a bank of line contacts arranged in horizontal rows or levels, which contacts are adapted to be engaged by a set of wipers 25 and 27 carried upon a shaft (not shown) which has a vertical movement controlled by the vertical magnet 28 and a rotary movement controlled by the rotary magnet 29. There is also a bank of private contacts engaged by the private wiper 26 and a further or extra bank engaged by the extra wiper 72. The operations of the switch are controlled through the medium of the double-wound line relay 30. Means for permitting the switch to be returned to normal position are provided in the release magnet 31, which, upon energizing, withdraws the retaining pawls from the shaft, which is instantly returned to normal in the well-known manner. Normally open contact springs 32 and 33 are provided, which close only when the switch shaft has been raised one or more steps from its lowest position. The relays 34 and 35 are slow acting—that is, they de-energize slowly after their energized circuits are broken. Means for automatically interrupting the circuit of the vertical magnet 28 is provided in the relay 105, as will be hereinafter explained. In addition to the regular line bank contacts and the private bank contacts, together with the usual line and private wipers, the selector E is provided with an extra shaft wiper 71 and an extra set of bank contacts *a*, as shown in Fig. 2. This extra bank of contacts consists of ten groups or levels, the same as the line and private banks, each group comprising ten pairs of contacts. The shaft wiper 71 is provided with a pair of wiping arms which engage with the two contacts of each pair and thus connect them together. In order to enable the switch to automatically step from one level to another, the corresponding levels in this extra bank of contacts are wired in a particular manner. This consists in electrically connecting the bottom contact of one set of bank contacts with the top contact of the next adjacent set, and so on, the bottom contact of the tenth or last set being grounded. When, as in the present instance, it is desired to select an idle trunk from either the fourth, fifth, sixth or seventh levels, then the fourth, fifth and sixth levels of the extra set of bank contacts would be wired in this manner.

I also provide a series of contacts $71^a$ (Fig. 2), there being one of these contacts for each of the levels 4, 5 and 6—that is, one for each level above which the wipers may be automatically raised, which contacts are adapted to be engaged by the wiper 72 carried by the switch shaft. If it were desired to have not only the fourth, fifth and sixth levels so arranged, but also the first, second and third, the contacts $71^a$ would be adapted to be engaged by the wiper 72 after the switch shaft is operated vertically one step, the first rotary step disengaging said contacts. However, since only levels 4, 5 and 6 are so arranged, the contacts $71^a$ are not engaged until the fourth level is reached. The wiper 71 is a short-circuiting wiper—that is, a wiper the function of which is to electrically connect the upper and lower contacts of any set in the extra bank upon which it may stop in the fourth, fifth and sixth levels. Therefore, it will be seen that if all the bank contacts of the fourth level, for example, are in use, a ground potential will be placed on the contact $71^a$ opposite the fourth level, said potential extending from ground $G^{20}$ through the short-circuiting wipers 71 of different first selector switches which are resting on the fourth level, and through the connections between the lower contact of one set to the upper contact of the next set, and thence to the contact $71^a$. As shown in the diagrammatic drawing Fig. 1, the fourth, fifth, sixth and seventh levels of the first selector banks are multipled throughout the exchange and thence lead to the manual office connectors $H^3$.

With the selectors constructed in this manner, they are enabled not only to automatically select an idle trunk in the fourth level, but if all the trunks in that level are busy, to automatically move up to the next or fifth level and find an idle trunk there, or if all the trunks in the fifth level are busy, to automatically pass to the sixth level, etc.

Figures 3, 6:
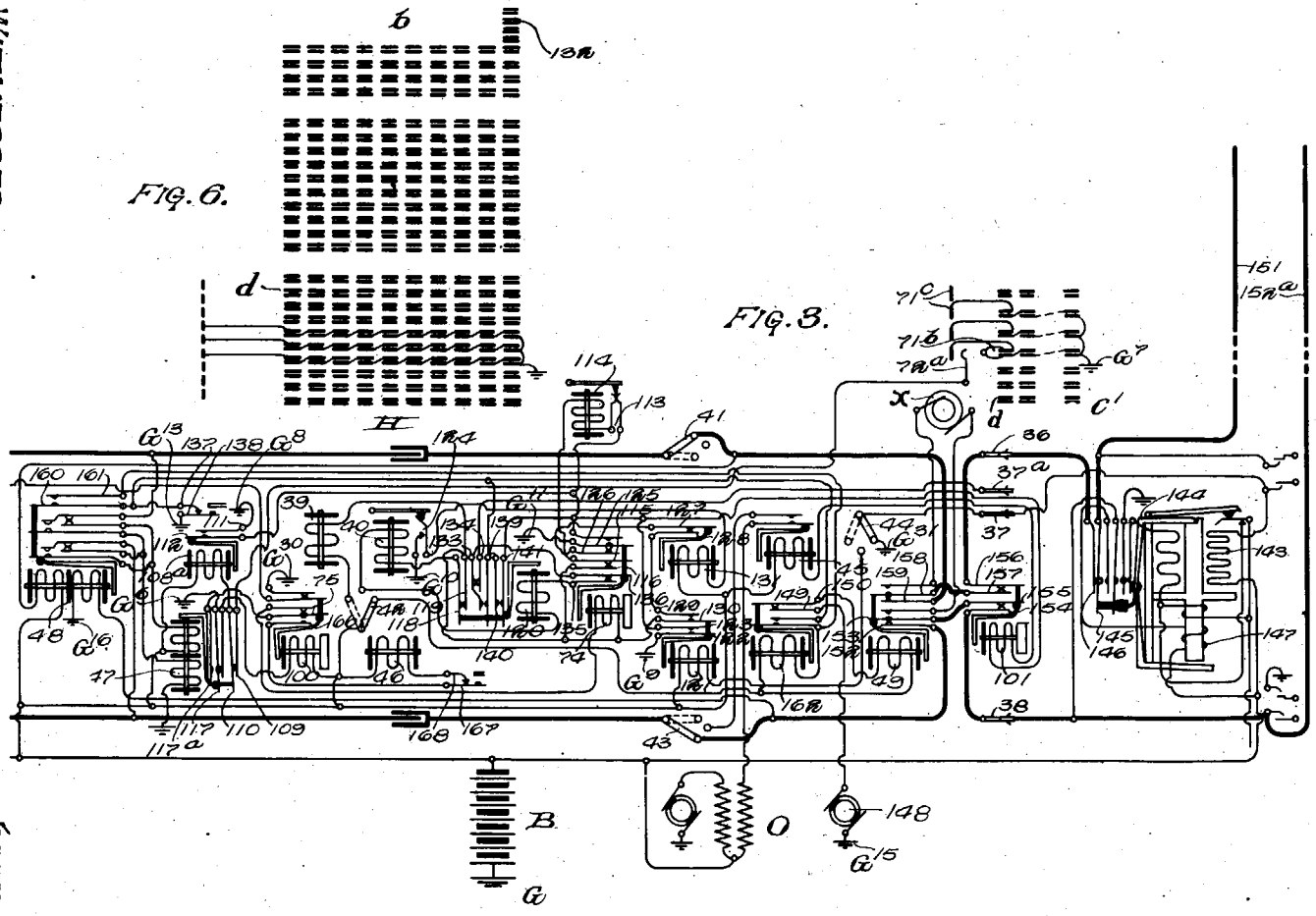
Fig. 6 is a detail view of a portion of the connector bank contacts.

The connector switch H (Fig. 3) is of the same general type of connector switch as that disclosed in United States Letters Patent No. 8'5,176, issued March 13, 1906, to Keith, Erickson and Erickson, the circuits, however, being modified to adapt the switch to operate in a system in which the central office apparatus is controlled by impulses delivered over the two sides of the line in series. The circuits are also modified to adapt the switch to operate in a system embodying the principles of my invention. Like the selectors, the connector is provided with a shaft (not shown) carrying the wipers 36, 37 and 38. Being a so-called rotary connector and of a particular type used to illustrate my invention, it also carries the extra wipers $37^a$, $71^b$ and $72^a$. The shaft is controlled by the vertical magnet 39 and the rotary magnet 40, and the usual side switch comprising the wipers 41, 42, 43 and 44 is controlled by the private magnet 45 in the usual and well-known manner. The magnet 46 is the usual release magnet. The line relay 47 is connected to the line through the reversing springs of a so-called back-bridge relay 48. The ringing relay 49 is the means by which ringing current is applied to the called trunk or line, as the case may be. At O there is shown a busy signaling machine which supplies a busy signal to the calling line through the medium of the busy relay 120 in case the called line is in use. At B a battery is shown which is for the purpose of supplying battery current for operating and talking purposes. The connector is also provided with a special contact bank *d*, shown in Figs. 3 and 6, similar to the bank *c* of the selectors.

A general description of the apparatus having been given, it will be explained how a connection is extended from a calling substation A, the line of which we will assume terminates in the main exchange, to a called substation A′, the line of which terminates in the manual exchange W. We will assume the number of the manual exchange to be 441. Upon the removal of the receiver from the switch hook at the substation A preparatory to making a call, an energizing circuit is closed through the line winding 13 of the individual switch C, thereby attracting the line armature 51. The armature, upon being attracted, closes a circuit through the pull-down coil 11 in series with the auxiliary winding 14. The pull-down coil, upon energizing, attracts the plunger arm 9, thereby operating to close circuits through the bank of springs 16 to 23, inclusive. It also operates the cut-off armature 15, thereby disconnecting the line winding 13 from the line. The armature 51 does not fall back immediately, however, owing to the fact that the winding 14 is still in series with the pull-down winding 11. Upon the plunger arm 9 being attracted, the springs $10^a$ and $12^a$ are brought together to short-circuit the auxiliary winding 14, thus permitting the armature 51 to fall back. This slow action of the armature 51 allows sufficient time for a holding circuit to be closed in the switch ahead for the cut-off or holding winding 12. The engagement of the springs 16 and 19 with the springs 20 and 23, respectively, extends the subscribers' lines to the line relay 30 of the selector E. The line relay 30 of the selector switch E is thereupon energized, closing a circuit through the relay 34. The relay 34, upon energizing, closes the above-mentioned holding circuit through the cut-off winding 12 of the line switch C. This circuit extends from ground $G^2$ through the springs 52, bank springs 21 and 17, cut-off winding 12 to battery B, thence through battery B to ground G. The winding 12, upon energizing, holds the armature 15 and plunger arm 9 in their operated positions after the circuit of the pull-down winding is broken by the falling back of the line armature 51. From the same point $G^2$ a guarding ground potential is supplied to the connector or normal private bank contacts of the calling line by way of the conductor 24 as soon as the relay 34 is energized. This circuit extends over the circuit just traced to the bank spring 17, thence over the normal conductor 24 to said private bank contact. The energization of the relay 34 also prepares a circuit for the vertical magnet by bringing into engagement the springs 53 and 54 and opens the circuit of the release magnet 31 at the spring 55.

The calling subscriber now operates his calling device for the first digit 4 of the called number, whereby the substation impulse springs 6 and 7 are separated four times momentarily, each time breaking the circuit of the selector line relay 30. The relay 34 of the selector being slow acting does not deënergize during the momentary interruptions of its circuit by the line relay 30, and consequently each time the latter relay deënergizes, an impulse is transmitted over the circuit extending from ground $G^3$ through the contact of springs 182 and 183, springs 57 and 56 of the relay 58, springs 53 and 54 of the relay 34, through the relay 35 and the vertical magnet 28 to battery B. The vertical magnet receives four impulses over this circuit and operates to raise the switch shaft and wipers four steps to a position opposite the fourth row or level of bank contacts. At the same time the wiper 72 engages the contact point $71^a$ of the fourth level. The slow acting relay 35 is maintained in its energized condition while impulses are being sent through the vertical magnet, and in its energized condition this relay closes a circuit from ground $G^4$ through the springs 68 and 67 and relay 66 to battery B. The relay 66, upon energizing, closes a locking circuit for itself extending from ground $G^2$ at the relay 34, through the springs 52, rotary magnet springs 60 and 59, off-normal springs 61 and 62 and springs 64 and 63 of the relay 66, thence through the relay 66 to battery B. It will be observed that the locking circuit for the relay 66 passes through the off-normal springs 61 and 62 and these off-normal springs are, of course, not closed until the switch shaft is raised at least one step, which is also true of the off-normal springs 32 and 33 that control the circuit of the release magnet 31. This relay 66 controls in part the circuit of the rotary magnet 29 and is locked in energized position at this stage of the operation for the purpose of preparing the circuit over which the rotary magnet 29 is subsequently to be operated. As a result of the pause that follows the sending of the four impulses from the telephone, the relay 35 deënergizes and upon so doing permits the springs 107 and 108 to close in contact, thereby closing a new circuit through the vertical magnet 28 for causing the switch shaft to be automatically raised above the fourth level if all the trunks in that level are busy. These springs 107 and 108 may be adjusted, if necessary, so that they will come into contact before the springs 67 and 69 come into contact. For example, if all of the the trunks leading from the fourth level are busy, a circuit will be found closed from ground $G^{20}$ through the series of bank contacts, (the upper and lower contacts of each set being connected together by the wiper 71 of the switch using that particular trunk), contact $71^a$, through the spring wiper 72, springs 103 and 104, relays 105 and 106, springs 108 and 107 and the vertical magnet 28 to battery B. The relays 105 and 106 and the vertical magnet 28 energize over the circuit just traced. The vertical magnet, upon energizing, operates to step the shaft and shaft wipers one step—that is, to a point opposite the fifth level of bank contacts. The relay 105, upon energizing, interrupts its own circuit at the springs 104, thereby allowing the vertical magnet to deënergize. If the fifth level trunks are all in use, the spring 72 will again engage a grounded contact and the foregoing operations will be repeated to step the shaft wipers to a point opposite the sixth level of bank contacts. Likewise, if the trunks leading from the sixth level are also busy, the shaft will be raised still another step. As the fourth, fifth, sixth and seventh levels were the only ones assigned to the connectors H which have access to the manual board $W^2$, the seventh level bank contact $71^a$ will not be connected. Therefore this contact will have no guarding ground potential, whereupon the relays 105 and 106 and the magnet 28 will all deënergize. During the automatic vertical operation of the switch shaft the relay 106, as pointed out, is maintained energized and while so energized retains the springs $69^a$ and $67^a$ separated to prevent the rotary magnet 29 from coming into operation. However, as soon as the relay 106 deënergizes, these springs come into contact and thereby close an energizing circuit for the said rotary magnet 29. Observe, however, that the springs under the control of this relay are so arranged that the springs $67^a$ and $69^a$ close before the springs $68^a$ separate, in order to insure against the relay 66 unlocking when the rotary armature separates the interrupter springs 59 should it do so before the private wiper 26 has been rotated sufficiently to engage the first private bank contact. This circuit extends from ground $G^2$ through the springs 52, 60 and 59, 61 and 62, 64 and 63, 67 and 69, $69^a$ and $67^a$, interrupter springs 70 and the rotary magnet 29 to battery B. The rotary magnet, upon energizing, rotates the wipers one step and by opening the springs 70 and the springs 59 and 60 disconnects the ground $G^2$ from itself and the relay 66. If the first trunk line of this level is idle, the relay 66 deënergizes as soon as the springs 70 are opened. If this trunk line is busy, however, the private wiper 26 finds the contact with which it engages provided with a guarding ground potential which is transmitted to the relay 66 through the springs 63 and 64, thereby preventing it from deënergizing. The rotary magnet, however, deënergizes when the springs 70 disengage regardless of whether the relay 66 remains energized or not. If the relay 66 remains energized, the circuit of the rotary magnet will be again closed as soon as the armature drops back far enough to close the springs 70. The rotary magnet will, therefore, operate intermittently to advance the wipers step by step over the contacts until a non-grounded contact of an idle trunk line is reached by the wiper 26, whereupon the relay 66 deënergizes. The relay 66, upon deënergizing, whether after one or several operations of the rotary magnet, permanently breaks the circuit of the magnet 29 and closes the circuit of the switching relay 58. The circuit through said relay 58 extends from ground $G^2$ through the springs 52, 60 and 59, 61 and 62, 64 and 65 and the relay 58 to battery B. The relay 58, upon energizing, disconnects the line relay 30 from the line and extends the line connection over the heavy conductors through the wipers 25 and 27 to the connector H.

When the connection is completed to the connector H, the circuit of the line relay 47 is closed. The relay 47, upon energizing, closes an energizing circuit through the slow relay 100. The relay 100, upon energizing, supplies a new holding ground $G^{30}$ to the relay 58 of the selector E, the original circuit having been broken by the deënergization of the relay 34 of the selector E. The energization of the relay 100 also prepares a circuit for the vertical magnet 39 and opens the circuit of the release magnet 46. When the substation calling device is operated for the second digit 4, the circuit of the line relay 47 is momentarily broken four times. Since the relay 100 is slow acting, it does not deënergize during the momentary interruptions of its circuit by the relay 47, so that each time the latter relay deënergizes, a circuit is closed extending from ground $G^6$ through the back contact springs 117 and $117^a$ of the relay 47, springs 75 of the relay 100, relay 74, vertical magnet 39 and the side switch wiper 42 to the battery B. The vertical magnet 39 receives four impulses over this circuit and operates to step the wipers 36, 37, $37^a$, 38, $72^a$ and $71^b$ to a position opposite the fourth level of bank contacts. The relay 74, which was included in series with the vertical magnet, remains in its energized position during the entire time that impulses are being transmitted and operates to close the circuit of the private magnet 45 in series with the slow relay 101. It will be assumed that the fourth, fifth, sixth and seventh levels of the connector banks are the levels from which the trunks leading to the manual board $W^2$ are taken. If the fourth level bank contacts are all in use, the contact $71^c$, which corresponds to the fourth bank level, will have a ground potential upon it extending from ground $G^7$ through the short-circuiting wipers $71^b$ (which are on the contacts of the fourth level) and thence to the contact $71^c$. The wiper $72^a$, upon coming in contact with the grounded contact $71^c$, closes a circuit extending from said ground through the wiper $72^a$, springs 109 and 110, relay $108^a$ to the battery B. The relay $108^a$, upon energizing, completes a circuit extending from ground $G^8$ through the springs 111 and 112, interrupter springs 113 and the relay 114 to the spring 115, and after the relay 74 deënergizes, the circuit then extends through the springs 115 and 116 to the vertical magnet 39 and the wiper 42 to the battery B. The relay $108^a$, upon energizing, also closes a circuit through the private magnet extending from ground $G^8$ through the springs 111 and 112, relay 101 and the private magnet 45 to the battery B. Thus the private magnet is held in an energized position even after the relay 74 deënergizes and until the spring $72^a$ is raised to an idle contact, whereupon it falls back and sends the side switch to second position. The vertical magnet and the relay 114 operate in the same manner as described for the selector E to raise the shaft wipers step by step until the wiper $72^a$ finds a non-grounded contact, at which time the relay $108^a$ deënergizes, thereby breaking the circuit of the private magnet 45, thereby allowing the side switch to pass to second position, as stated. The side switch, upon passing to second position, causes the wiper 42 to transfer the battery connection from the vertical magnet to the rotary magnet 40, leaving the apparatus in readiness for the last digit 1.

After the second pause the calling device is operated for the digit 1, thereby momentarily deënergizing the relay 47 once, which relay then closes an energizing circuit through the rotary magnet 40. This circuit extends from ground $G^6$ through the back contact of the spring 117, springs 75, relay 74, springs 118 and 119, magnet 40 and the wiper 42 to the battery B. The relay 74 energizes as before to open the circuit of the relay 114 and the busy relay 120 and to again close the circuit of the private magnet 45. The rotary magnet energizes over the circuit above traced and steps the shaft wipers on the first contact of the bank level in which there is an idle contact. If it is the first contact that is idle, the relay 121 will not pull up, and since the relay 74 deënergizes after the impulse is transmitted, the private magnet will deënergize and allow the side switch wipers to pass to third position. If, however, the trunk terminating on the first contact is busy, the private wiper 37 will find the first bank contact grounded and the relay 121 will be held up over a circuit extending from said ground at the private wiper through the side switch wiper 44 (in second position) and the relay 121 to battery B. The relay 121, upon energizing, closes another circuit for the private magnet 45 extending from ground $G^9$ through the springs 122 and 123, thence over a circuit heretofore traced through the magnets 101 and 45 to battery B. The energization of the relay 121 also closes an energizing circuit for the rotary magnet 40, the relay 74 having deënergized, as stated, said circuit extending from ground $G^{11}$ through the springs 125 and 126, 127 and 128, 129 and 130, 119 and 118, magnet 40 and the wiper 42 to battery B. The rotary magnet, upon energizing, operates to rotate the shaft wipers one step onto the next trunk line and also operates to close the circuit of the relay 131 by the closure of the springs 124. The relay 131, upon energizing, opens the circuit of the rotary magnet at the springs 127 and 128, causing the rotary armature to fall back, as well as the relay 131. If the second trunk line is also in use, the wiper 37 will still engage a grounded contact and the relay 121 will remain energized, whereupon the operations of the rotary magnet and the relay 131 will be repeated to rotate the shaft wipers onto an idle trunk line and the relay 121 will deënergize and break the circuits of the rotary magnet 40 and also of the cut-off and private magnets 101 and 45, respectively, whereupon the private magnet will permit the side switch to pass to third position and the cut-off magnet 101 will cut the talking circuit through to the line wipers 36 and 38. The wiper 44, upon passing to third position, supplies a guarding ground potential from ground $G^{31}$ to the private bank contact of the called line in the banks of all the connectors which have access to said line, and also closes an energizing circuit through the winding 143 of the individual switch C′ of the called line. The winding 143, upon becoming energized, attracts the armature 144, which brings the springs 145 and 146 into engagement and also disconnects the line winding 147 from the line. The side switch wipers 41 and 43, upon passing to third position, complete the connection from the calling line through to the called manual board $W^2$, as shown by the heavy conductors. The side switch wiper 42, upon passing to third position, transfers the battery connection to the ringing relay 49. The relay 49 energizes over a circuit extending from ground $G^{15}$ through the interrupter 148, springs 149 and 150, relay 49 and the wiper 42 to battery B. The relay 49 is intermittently energized over this circuit and operates to disconnect the calling line from the called line and to intermittently connect the ringing current generator X with the called line. In response to this signal the operator at the board $W^2$ answers the call and in so doing closes a bridge across the conductors 151 and $152^a$, whereby an energizing circuit is closed through the back-bridge relay 48 of the connector H. This circuit extends from ground $G^{16}$ through the right-hand winding of the relay 48, thence through the springs 152 and 153, 155 and 154, conductor $152^a$ to and through said bridge at the board $W^2$, back over the conductor 151, springs 145 and 146, 156 and 157, 158 and 159 and the left-hand winding of the relay 48 to battery B. The relay 48, upon energizing, operates to reverse the battery to the calling line. The relay 48, upon energizing, also operates to close the springs 160 and 161, thus closing an energizing circuit through the ringing cut-off relay 162. This circuit extends from ground $G^{13}$ through the off-normal springs 138 and 137 (closed upon the first vertical step of the switch shaft), thence through the springs 160 and 161 and the relay 162 to battery B. The relay 162, upon energizing, closes a locking circuit for itself independent of the springs 160 and 161 of the back-bridge relay, and also operates to open the circuit of the ringing relay 49, whereby the ringing current is disconnected from the called line.

The release of the connection is brought about by the hanging up of the receiver at the calling substation as follows: The placing of the receiver on the switch hook at the calling substation opens the circuit of the connector line relay 47 at the springs 163 and 164. The relay 47, upon deënergizing, opens the circuit of the relay 100. The relay 100, upon deënergizing, closes an energizing circuit through the release magnet 46 and also disconnects the holding ground from the relay 58 and the winding 12 of the switches E and C, respectively. The circuit for the connector release magnet 46 extends from ground $G^6$ through the back contact of spring 117, thence through the springs 75 and 166, off-normal springs 167 and 168 and the magnet 46 to battery B. The magnet 46, upon energizing, disengages the retaining pawls from the shaft, allowing it to return to normal position. The shaft, upon returning to normal, opens the circuit of the release magnet 46 and also opens the circuit of the ringing cut-off relay 162 at the springs 137 and 138. The relay 58 of the selector E, upon deënergizing, closes a circuit through the release magnet 31. This circuit extends from ground $G^3$ through the springs 183 and 182, 57 and 56, 53 and 55, 32 and 33 and the magnet 31 to battery B. Like the connector, the circuit of the release magnet is broken upon the shaft reaching its lowest position. The winding 12 of the line switch C, upon deënergizing, allows the plunger arm 9 and armature 15 to return to normal position, thereby leaving the apparatus in readiness for another call.

We will now consider the operation when all of the trunks running to the board $W^2$ are busy. Under such conditions, the switch shaft will be carried from the fourth to the seventh level automatically, and, after reaching the seventh level, it will be automatically rotated until it reaches the last set of contacts. The wipers 37 and $37^a$ will at this time come in contact with the last pair of contacts 132 in the upper or private bank *b* (Fig. 6) which it will be seen are connected together. By this arrangement, when all of the trunks running to the board $W^2$ are busy, a circuit is closed through the switch wipers 37 and $37^a$, said circuit extending from ground at the wiper 37, through the loop 132 (Fig. 6), wiper $37^a$, springs 133 and 134, 136 and 135, relay 120 and the wiper 42 to battery B. The relay 120 energizes to open the rotary magnet circuit at the springs 118 and 119 and also closes a locking circuit for itself extending from ground $G^{13}$ through the springs 137 and 138, 139 and 133, 136 and 135, thence through the relay 120 and the wiper 42 to battery. This ground connection also extends from the spring 139 through the springs 140 and 141, thence over the circuit heretofore traced to the private magnet 45, thereby holding the side switch in second position. The relay 101, which is in the private magnet circuit, energizes in this instance to keep the busy signal from the called line. The private magnet 45, upon energizing, operates to close a busy signal upon the calling line in the usual and well-known manner. When the calling subscriber receives the busy signal, he restores his receiver to the switch hook and releases the apparatus as before.

It will thus be seen that I have devised a very efficient telephone system and one which is much more flexible than previous systems and one in which the percentage of trunking can be greatly increased, as the selectors and connectors are adapted to not only select an idle trunk from a group of ten trunks, for example, but from among a much larger number of trunks.

While I have illustrated my invention in connection with a well-known form of automatic selectors and connectors, it will, of course, be understood that my invention is of much broader scope and is equally as well adapted for use in connection with switches of many other types, my invention contemplating in its broader aspect the feature of a switch which is enabled to first automatically select groups and to then automatically select an idle trunk in the selected group. Various other modifications and changes will readily suggest themselves to those skilled in the art, and I accordingly do not wish to be limited to the specific embodiment of my invention with which I have chosen to illustrate the same.

What I claim as my invention is:—

1. In a telephone system, a plurality of trunk lines divided into groups, an automatic selector switch with a progressively movable element having motion in one plane to select groups and motion in a plane at right-angles thereto to find an idle line in the selected group, other similar selectors for the same purpose, and means including a set of test bank contacts and busy test circuits therefor for automatically controlling the movement of said element from one group to the next if all the trunks in the selected group are busy, said test circuits including the progressively movable elements of a plurality of said other switches.

2. In a telephone system, a subscriber's line, a plurality of groups of trunk lines, a selector switch, means controlled by said subscriber for operating said switch to select one of a plurality of said groups, and means for then moving said switch automatically to select another of said groups if all the trunks in said first selected group are busy.

3. In a telephone system, a plurality of subscribers' lines, a plurality of selector and connector switches, a plurality of groups of trunk lines extending from said selector switches to a series of said connector switches, a plurality of groups of lines extending from said connectors to a called subscriber's line, means controlled by a calling subscriber for extending the connection to one of said selectors and for then operating said selector to select one of a plurality of groups of said trunk lines, means in said selector for then automatically selecting an idle group of said trunks and for then selecting an idle trunk in the selected group to extend the connection to one of said connectors, means controlled by said subscriber for then operating the connector to select the desired group of lines extending to the called subscriber's station, and means in said connector for then automatically selecting an idle group of said lines and then selecting an idle line in the selected group.

4. In a telephone system, a plurality of groups of lines, a series of switches associated therewith, having means for automatically selecting idle groups, means for making a group busy, comprising a circuit controlled directly by a plurality of said switches.

5. In a telephone system, a plurality of groups of lines, a series of switches associated therewith, having means for automatically selecting idle groups, means for making a group busy, comprising a circuit together with means common to the lines for directly controlling it.

6. In a telephone system, a plurality of groups of lines, a series of switches associated therewith, having means for automatically selecting idle groups, means for making a group busy, comprising a circuit together with means individual to a switch for directly controlling it.

7. In a telephone system, a plurality of groups of lines, a series of switches associated therewith each having a progressively movable element, having means for automatically selecting idle groups, means for making a group busy, comprising a circuit controlled directly by the said progressively movable element, and means for making said switches common to the lines.

8. In a telephone system, a plurality of groups of lines, a series of switches associated therewith, having means for automatically selecting idle groups, means for making a group busy, comprising a circuit and banks for said switches through which said circuit passes, said circuit controlled directly by said switches and means for making said switches common to the lines.

9. In a telephone system, a plurality of groups of lines, a series of switches associated therewith, having means for automatically selecting idle groups, means for making a group busy, comprising a circuit and banks for said switches through which said circuit passes, said circuit controlled directly by means individual to the switch, and means for making said switch common to the lines.

10. In a telephone system, a plurality of groups of lines, a series of switches associated therewith, having means for automatically selecting idle groups, means for making a group busy, comprising a link circuit controlled directly by a plurality of said switches.

11. In a telephone system, a plurality of groups of lines, a series of switches associated therewith, having means for automatically selecting idle groups, means for making a group busy, comprising a link circuit together with means common to the lines for directly controlling it.

12. In a telephone system, a plurality of groups of lines, a series of switches associated therewith, each having a progressively movable element, having means for automatically selecting idle groups, means for making a group busy, comprising a link circuit controlled directly by one of said progressively movable elements and means for making said switches common to the lines of a group.

13. In a telephone system, a plurality of groups of lines, a series of switches associated therewith, having means for automatically selecting idle groups, means for making a group busy, comprising a link circuit and banks for said switches through which said circuit passes, said circuit controlled directly by said switches, and means for making said switches common to the lines.

14. In a telephone system, a plurality of trunk lines divided into groups, a selector switch associated therewith, means for automatically selecting an idle group, means for automatically selecting an idle trunk in the group, and means for making a group busy when all the lines therein have been seized, comprising a circuit controlled directly by a plurality of said switches.

15. In a telephone system, a plurality of trunk lines divided into groups, a selector switch associated therewith, means for automatically selecting an idle group, means for automatically selecting an idle trunk in the group, and means for making a group busy when all the lines therein have been seized, comprising a circuit together with means common to the lines for directly controlling it.

16. In a telephone system, a plurality of trunk lines divided into groups, a selector switch associated therewith, means for automatically selecting an idle group, means for automatically selecting an idle trunk in the group, and means for making a group busy when all the lines therein have been seized, comprising a circuit together with means individual to a switch for directly controlling it.

17. In a telephone system, a plurality of trunk lines divided into groups, a selector switch having a progressively movable element associated therewith, means for automatically selecting an idle group, means for automatically selecting an idle trunk in the group, and means for making a group busy when all the lines therein have been seized, comprising a circuit controlled directly by said progressively movable element, and means for making said switch common to the lines.

18. In a telephone system, a plurality of trunk lines divided into groups, a selector switch associated therewith, means for automatically selecting an idle group, means for automatically selecting an idle trunk in the group, and means for making a group busy when all the lines therein have been seized, comprising a circuit and banks for said switch through which said circuit passes, said circuit controlled directly by said switch, and means for making said switch common to the lines.

19. In a telephone system, a plurality of trunk lines divided into groups, a selector switch associated therewith, means for automatically selecting an idle group, means for automatically selecting an idle trunk in the group, and means for making a group busy when all the lines therein have been seized, comprising a circuit and banks for said switch through which said circuit passes, and means individual to the switch for directly controlling said circuit, and means for making said switch common to the lines.

20. In a telephone system, a plurality of groups of lines, a switch associated therewith, having progressively movable means for automatically selecting an idle group, means for making a group busy, comprising a circuit controlled directly by said progressively movable means in the switch.

21. In a telephone system, a plurality of groups of lines, a switch associated therewith, having progressively movable means for automatically selecting an idle group, means for making a group busy, comprising a circuit controlled directly by said progressively movable means individual to the switch.

22. In a telephone system, a plurality of groups of lines, a switch associated therewith having a progressively movable element, having means for automatically selecting an idle group, means for making a group busy, comprising a circuit, said circuit controlled directly by said progressively movable element, and means for making said switch common to the lines.

23. In a telephone system, a plurality of groups of lines, a switch associated therewith, having means for automatically selecting an idle group, means for making a group busy, comprising a circuit and a bank for said switch through which said circuit passes and which is controlled directly by said switch, and means for making said switch common to the lines.

24. In a telephone system, a plurality of groups of lines, a switch associated therewith, having means for automatically selecting an idle group, means for making a group busy, comprising a circuit and a bank for said switch through which said circuit passes, means individual to a switch, for directly controlling said circuit, and means for making said switch common to the lines.

25. In a telephone system, a plurality of trunk lines, a series of switches for connecting with said trunk lines, said trunk lines divided into groups, means comprising said switches for selecting an idle group and for selecting an idle line in a group and means for making a group busy comprising a circuit having a plurality of terminals in each switch.

26. In a telephone system, a plurality of trunk lines, a series of switches each having a progressively movable element for connecting with said trunk lines, said trunk lines divided into groups, means comprising said switches for selecting an idle group, means for making a line busy and for selecting an idle line in a group, and means directly controlled by said progressively movable element for making a group busy independent of the control of the means for making a line busy.

27. In a telephone system, a plurality of trunk lines divided into groups, a switch for connecting with any one of said trunks having a progressively movable element, means for enabling the switch to select an idle line, means for making a group busy and for selecting an idle group comprising an auxiliary circuit directly controlled by said element, and a releasing device for the switch, said device controlling the said auxiliary circuit.

28. In a telephone system, a plurality of trunk lines divided into groups, a switch for connecting with any one of said trunks having a progressively movable element, means for enabling the switch to select an idle line, means for making a group busy and for selecting an idle group comprising an auxiliary circuit directly controlled by said element, and a releasing device for the switch and for opening the auxiliary circuit during the release.

29. In a telephone system, a line, a calling device therefor, a switch, a line leading to said switch, a group of line terminals in said switch, another group of line terminals in said switch divided into sub-groups, a movable member in said switch for connecting the switch line with the terminals in the switch, means controllable from the calling device to carry said member to the first group and also into engagement with a terminal in said first group, means responsive to the calling device to carry the said member to a sub-group in the second group and if that sub-group is busy to automatically carry said member to a non-busy sub-group and into engagement with a non-busy line in a non-busy sub-group.

30. In a telephone system, a line, a calling device therefor, a rotary connector switch, a line leading to said switch, a group of line terminals in said switch, a group of trunk terminals in said switch divided into sub-groups, a movable member in said switch for connecting the switch line with the terminals in the switch, means controllable over the switch line from the calling device to carry the said member to the group of line terminals and also into engagement with a line terminal in said group, and means responsive to the calling device over the switch line to carry the said member to a sub-group of the trunk terminals, and if all the lines in that sub-group are busy to automatically and independently of the line carry said member to a sub-group, all the lines of which are not busy and into engagement with a non-busy line therein.

31. In a telephone system, a line, a calling device therefor, a trunk selector switch, a group of trunk terminals in said switch, another group of trunk terminals in said switch divided into sub-groups, a movable member in said switch for connecting the line with the terminals in the switch, means controllable over the line from the calling device to carry said member to the first group, and for automatically carrying the member over the busy terminals in said group whether all the lines in the group are busy or not, and means responsive to impulses from the calling device over the line to carry said member to a sub-group in a second group and if all the lines in that sub-group are busy to automatically and independently of the line carry said member to another sub-group and into engagement with a non-busy line therein.

32. In a telephone system, a plurality of groups of lines, a series of switches associated therewith, having means for automatically selecting idle groups, means for making a group busy, comprising a circuit together with means common to the lines for directly controlling it, said last means involving movable contacts under the control of the switches.

33. In a telephone system, a plurality of groups of lines, a series of switches associated therewith having means for automatically selecting idle groups, means for making a group busy, comprising a circuit together with means individual to a switch for directly controlling it, said last means involving movable contacts under the control of the switches.

34. In a telephone system, a plurality of groups of lines, a series of switches associated therewith, having means for automatically selecting idle groups, means for making a group busy, comprising a link circuit together with means common to the lines for directly controlling it, said last means involving movable contacts under the control of the switches.

35. In a telephone system, a plurality of trunk lines divided into groups, a selector switch associated therewith, means for automatically selecting an idle group, means for automatically selecting an idle trunk in the group, and means for making a group busy when all the lines therein have been seized, comprising a circuit together with means common to the lines for directly controlling it, said last means involving movable contacts under the control of the switch.

36. In a telephone system, a plurality of trunk lines divided into groups, a selector switch associated therewith, means for automatically selecting an idle group, means for automatically selecting an idle trunk in the group, and means for making a group busy when all the lines therein have been seized, comprising a circuit together with means individual to a switch for directly controlling it, said last means involving movable contacts under the control of the switch.

37. In a telephone system, a plurality of groups of lines, a series of switches associated therewith having means for automatically selecting idle groups, means for making a group busy and means for making a group non-busy, one of said means comprising a circuit controlled directly by a plurality of said switches.

38. In a telephone system, a plurality of groups of lines, a series of switches associated therewith having means for automatically selecting idle groups, means for making a group busy and means for making a group non-busy, one of said means comprising a circuit together with means common to the lines for directly controlling it.

39. In a telephone system, a plurality of groups of lines, a series of switches associated therewith having means for automatically selecting idle groups, means for making a group busy and means for making a group non-busy, one of said means comprising a circuit together with means individual to a switch for directly controlling it.

40. In a telephone system, a plurality of groups of lines, a series of switches associated therewith having means for automatically selecting idle groups, means for making a group busy and means for making a group non-busy, one of said means comprising a circuit controlled directly by the switches, and means for making said switches common to the lines of the group.

41. In a telephone system, a plurality of groups of lines, a series of switches associated therewith having means for automatically selecting idle groups, means for making a group busy and means for making a group non-busy, one of said means comprising a circuit controlled directly by one of said switches, and means for making said switch common to the lines of the group.

42. In a telephone system, a plurality of groups of lines, a series of switches associated therewith having means for automatically selecting idle groups, means for making a group busy and means for making a group non-busy, one of said means comprising a circuit, banks for said switches through which said circuit passes, said circuit controlled directly by said switches, and means for making said switches common to the lines.

43. In a telephone system, a plurality of trunk lines divided into groups, a selector switch associated therewith, means for automatically selecting an idle group, means for automatically selecting an idle trunk in the group, means for making a group busy and means for making a group non-busy when all the lines therein have been seized, one of said means comprising a circuit controlled directly by said switch.

44. In a telephone system, a plurality of trunk lines divided into groups, a selector switch associated therewith, means for automatically selecting an idle group, means for automatically selecting an idle trunk in the group, means for making a group busy and means for making a group non-busy when all the lines therein have been seized, one of said means comprising a circuit together with means common to the lines for directly controlling it.

45. In a telephone system, a plurality of trunk lines divided into groups, a selector switch associated therewith, means for automatically selecting an idle group, means for automatically selecting an idle trunk in the group, means for making a group busy and means for making a group non-busy, when all the lines therein have been seized, one of said means comprising a circuit together with means individual to a switch for directly controlling it.

46. In a telephone system, a plurality of trunk lines divided into groups, a selector switch associated therewith, means for automatically selecting an idle group, means for automatically selecting an idle trunk in the group, means for making a group busy and means for making a group non-busy when all the lines therein have been seized, one of said means comprising a circuit controlled directly by a switch, and means for making said switch common to the lines of a group.

47. In a telephone system, a plurality of trunk lines divided into groups, a selector switch associated therewith, means for automatically selecting an idle group, means for automatically selecting an idle trunk in the group, means for making a group busy and means for making a group non-busy when all the lines therein have been seized, one of said means comprising a circuit, banks for said switch through which said circuit passes, said circuit controlled directly by said switch, and means for making said switch common to the lines.

48. In a telephone system, a plurality of trunk lines divided into groups, a selector switch associated therewith, means for automatically selecting an idle group, means for automatically selecting an idle trunk in the group, means for making a group busy and means for making a group non-busy when all the lines therein have been seized, one of said means comprising a circuit, banks for said switches through which said circuit passes, said circuit controlled directly by means individual to the switch and means for making said switch common to the lines of a group.

49. In a telephone system, a plurality of groups of lines, a series of switches associated therewith, having means for automatically selecting idle groups, a busy test circuit for a group, means for applying a potential to said circuit to make the group busy and for removing said potential from the circuit to make the group non-busy, comprising a circuit controlled directly by a plurality of said switches.

50. In a telephone system, a plurality of groups of lines, a series of switches associated therewith having means for automatically selecting idle groups, a busy test circuit for a group, means for applying a potential to said circuit to make the group busy and for removing said potential from the circuit to make the group non-busy, comprising a circuit together with means common to the lines for directly controlling it.

51. In a telephone system, a plurality of groups of lines, a series of switches associated therewith, having means for automatically selecting idle groups, a busy test circuit for a group, means for applying a potential to said circuit to make the group busy and for removing said potential from the circuit to make the group non-busy, comprising a circuit together with means individual to a switch for directly controlling it.

52. In a telephone system, a plurality of groups of lines, a series of switches associated therewith having means for automatically selecting idle groups, a busy test circuit for a group, means for applying a potential to said circuit to make the group busy and for removing said potential from the circuit to make the group non-busy, comprising a circuit controlled directly by the switches, and means for making said switches common to the lines of a group.

53. In a telephone system, a plurality of groups of lines, a series of switches associated therewith, having means for automatically selecting idle groups, a busy test circuit for a group, means for applying a potential to said circuit to make the group busy and for removing said potential from the circuit to make the group non-busy, comprising a circuit, banks for said switches through which said circuit passes, said circuit controlled directly by said switches, and means for making said switches common to the lines.

54. In a telephone system, a plurality of groups of lines, a series of switches associated therewith, having means for automatically selecting idle groups, a busy test circuit for a group, means for applying a potential to said circuit to make the group busy and for removing said potential from the circuit to make the group non-busy, comprising a circuit, banks for said switches through which said circuit passes, means individual to the switch for directly controlling said circuit, and means for making said switch common to the lines of a group.

55. In a telephone system, a plurality of trunk lines divided into groups, a selector switch associated therewith, means for automatically selecting an idle group, means for automatically selecting an idle trunk in the group, a busy test circuit for a group, means for applying a potential to said circuit to make the group busy when all the lines therein have been seized and for removing said potential from the circuit to make the group non-busy, comprising a circuit controlled directly by said switch.

56. In a telephone system, a plurality of trunk lines divided into groups, a selector switch associated therewith, means for automatically selecting an idle group, means for automatically selecting an idle trunk in the group, a busy test circuit for a group, means for applying a potential to said circuit to make the group busy when all the lines therein have been seized and for removing said potential from the circuit to make the group non-busy, comprising a circuit together with means common to the lines for directly controlling it.

57. In a telephone system, a plurality of trunk lines divided into groups, a selector switch associated therewith, means for automatically selecting an idle group, means for automatically selecting an idle trunk in the group, a busy test circuit for a group, means for applying a potential to said circuit to make the group busy when all the lines therein have been seized and for removing said potential from the circuit to make the group non-busy, comprising a circuit together with means individual to a switch for directly controlling it.

58. In a telephone system, a plurality of trunk lines divided into groups, a selector switch associated therewith, means for automatically selecting an idle group, means for automatically selecting an idle trunk in the group, a busy test circuit for a group, means for applying a potential to said circuit to make the group busy when all the lines therein have been seized and for removing said potential from the circuit to make the group non-busy, comprising a circuit directly controlled by a switch, and means for making said switch common to the lines.

59. In a telephone system, a plurality of trunk lines divided into groups, a selector switch associated therewith, means for automatically selecting an idle group, means for automatically selecting an idle trunk in the group, a busy test circuit for a group, means for applying a potential to said circuit to make the group busy and for removing said potential from the circuit to make the group non-busy, comprising a circuit, banks for said switch through which said circuit passes, said circuit controlled directly by said switch, and means for making said switch common to the lines.

60. In a telephone system, a plurality of trunk lines divided into groups, a selector switch associated therewith, means for automatically selecting an idle group, means for automatically selecting an idle trunk in the group, a busy test circuit for a group, means for applying a potential to said circuit to make the group busy when all the lines therein have been seized and for removing said potential from the circuit to make the group non-busy, comprising a circuit, banks for said switch through which said circuit passes, means individual to the switch for directly controlling said circuit, and means for making said switch common to the lines.

61. In a telephone system, a plurality of automatic switches, groups of lines accessible to said switches, a test circuit for each of said groups, including serially related fixed contacts in a plurality of said switches, means for operating one of said switches to close one of said circuits to make the associated group busy, and means for releasing the operated switch to make the group non-busy.

62. In a telephone system, a plurality of automatic switches, groups of lines accessible to said switches, multiple test contacts in said switches corresponding to said groups, a source of busy potential temporarily connected to one of said test contacts by way of progressively movable contacts in a plurality of operated switches, and means for releasing any operated switch to disconnect the said source.

63. In a telephone system, a plurality of automatic switches, groups of lines accessible to said switches, multiple test contacts in said switches corresponding to said groups, means including a circuit passing through progressively movable contacts of a plurality of switches closed in the operation thereof to place a busy potential on one of said test contacts, and means for releasing any operated switch to break the said circuit.

64. In a telephone system, a plurality of groups of lines, a plurality of automatic switches having access to said lines, a temporarily closed circuit including fixed and progressively movable contacts in a plurality of switches for rendering one of said groups busy, and means for releasing the movable contacts in one of said switches to break the said circuit.

65. In a telephone system, lines divided into groups and sub-groups, a plurality of automatic switches directively controllable to select desired groups of lines and automatically operable to select idle sub-groups, a circuit temporarily closed through the medium of a plurality of operated switches to render one of said sub-groups busy, and means in each operated switch responsive to the release thereof to break said circuit to render the said sub-group non-busy.

66. In a telephone system, a plurality of groups of lines, a plurality of automatic switches having access to said lines, certain of said switches being temporarily in operated position, multiple test contacts in said switches corresponding to said groups, means in another of said switches responsive to the operation thereof to place a busy potential on one of said test contacts, and means in one of said first operated switches responsive to the release thereof to directly remove said potential.

67. In a telephone system, a plurality of groups of lines, a plurality of automatic switches having access to said lines, certain of said switches being temporarily in operated position to connect, respectively, with the lines of one of said groups, multiple test contacts in said switches corresponding to said groups, a source of busy potential connected to the test contacts corresponding to the connected group, and means in each operated switch responsive to the release thereof for directly disconnecting said source from the said test contacts.

Signed by me at Chicago, Illinois, this 18th day of June, 1913.

RAYMOND H. BURFEIND.

Witnesses:

ALBERT ANDERSEN,

GEO. YANOCHOWSKI.